(12) United States Patent
Kentris et al.

(10) Patent No.: US 11,157,992 B2
(45) Date of Patent: Oct. 26, 2021

(54) METHODS AND SYSTEMS FOR GENERATING A CUSTOMIZED RETURN POLICY

(71) Applicant: Shopify Inc., Ottawa (CA)

(72) Inventors: Anthony Nicholas Kentris, Toronto (CA); Raphael Paquin, Montreal (CA); Clara Petit, Montreal (CA)

(73) Assignee: Shopify Inc., Ottawa (CA)

( * ) Notice: Subject to any disclaimer, the term of this patent is extended or adjusted under 35 U.S.C. 154(b) by 109 days.

(21) Appl. No.: 16/699,179

(22) Filed: Nov. 29, 2019

(65) Prior Publication Data

US 2021/0166243 A1 Jun. 3, 2021

(51) Int. Cl.
| | | |
|---|---|---|
| *G06Q 30/06* | (2012.01) | |
| *G06Q 10/08* | (2012.01) | |
| *G06Q 30/00* | (2012.01) | |

(52) U.S. Cl.
CPC ..... *G06Q 30/0635* (2013.01); *G06Q 10/0838* (2013.01); *G06Q 10/0837* (2013.01); *G06Q 30/012* (2013.01)

(58) Field of Classification Search
None
See application file for complete search history.

(56) References Cited

U.S. PATENT DOCUMENTS

| | | | | |
|---|---|---|---|---|
| 8,510,171 B2* | 8/2013 | Pederson | ............ | G06Q 30/02 |
| | | | | 705/26.8 |
| 9,098,853 B2* | 8/2015 | Sundaresan | ........ | G06Q 30/0633 |
| 9,280,783 B2* | 3/2016 | Toumayan | ............ | G06Q 30/02 |
| 10,497,000 B1* | 12/2019 | Barstad | ................ | G06Q 20/407 |
| 2002/0133425 A1* | 9/2002 | Pederson | ............ | G06Q 30/012 |
| | | | | 705/26.1 |
| 2003/0225625 A1* | 12/2003 | Chew | ................... | G06Q 30/06 |
| | | | | 705/24 |
| 2004/0133458 A1* | 7/2004 | Hanrahan | .......... | G06Q 10/0631 |
| | | | | 705/7.12 |
| 2006/0149577 A1* | 7/2006 | Stashluk, Jr. | ...... | G06Q 10/0837 |
| | | | | 705/340 |
| 2010/0030577 A1* | 2/2010 | Lawson | ................ | G16H 15/00 |
| | | | | 705/3 |

(Continued)

OTHER PUBLICATIONS

Yu, C.-C., et al., "A Hybrid Mining Approach for Optimizing Returns Policies in e Retailing," Proceedings of the 9th Joint Conference on Information Sciences, JCIS 2006, Atlantis Press, Dec. 1, 2006. (Year: 2006).*

*Primary Examiner* — Nicholas D Rosen
(74) *Attorney, Agent, or Firm* — Rowand LLP

(57) ABSTRACT

Systems and methods to improve an e-commerce platform through modifications to the checkout and fulfillment process aimed at reducing the incidence of returns. Modifications may include determining a likelihood of a return and, based on the likelihood of return, generating a staged fulfillment process in which an order is split in two linked orders that are processed serially and based on receipt of confirmation to proceed after delivery of a first one of the orders. Modifications may include determining during the checkout process that a custom return policy is to be used and generating the custom return policy based, at least in part, on one or more of a purchaser return history, the product item or items in the order, and product return history.

23 Claims, 8 Drawing Sheets

(56) References Cited

U.S. PATENT DOCUMENTS

| | | | |
|---|---|---|---|
| 2011/0238484 A1* | 9/2011 | Toumayan | G06Q 30/0641 705/14.39 |
| 2014/0114803 A1* | 4/2014 | Sundaresan | G06Q 30/0633 705/26.35 |
| 2019/0244214 A1* | 8/2019 | Flores | G06Q 20/407 |

* cited by examiner

FIG. 2

METHODS AND SYSTEMS FOR GENERATING A CUSTOMIZED RETURN POLICY

FIELD

The present disclosure relates to computer-implemented e-commerce platforms and, in particular, to methods and systems for generating a customized return policy.

BACKGROUND

A merchant may use an e-commerce platform to sell products to customers. These products are often shipped to the customer by the merchant. In the event that the customer is unsatisfied with the product, the customer may be permitted to return the product to the merchant. For example, the customer could ship the product back to the merchant for a refund and/or for an exchange of the product.

Product returns have an associated cost. For example, there is a cost associated with shipping a product from a customer back to a merchant. Some merchants offer free returns, and therefore the cost to ship the item back to the merchant may be paid for by the merchant. Product returns also have an environmental impact. For example, return shipments typically require additional transportation and/or packaging, both of which can be sources of pollution. Moreover, in many cases returned product cannot be repackaged or resold and ends up being sent to landfill or otherwise destroyed.

Product returns on an e-commerce platform are a particular issue because of the inability of the purchaser to assess products for suitability prior to purchase. This may lead to a higher incidence of returns than with traditional brick-and-mortar retailing. The fact that the purchase is being created using an online e-commerce platform may, however, allow for possibilities to dynamically modify the online commerce process with a view to reducing the occurrence of unnecessary returns.

BRIEF DESCRIPTION OF THE DRAWINGS

Embodiments will be described, by way of example only, with reference to the accompanying figures wherein:

FIG. 2 is an example of a home page of an administrator, according to one embodiment;

DETAILED DESCRIPTION

Figure 1:
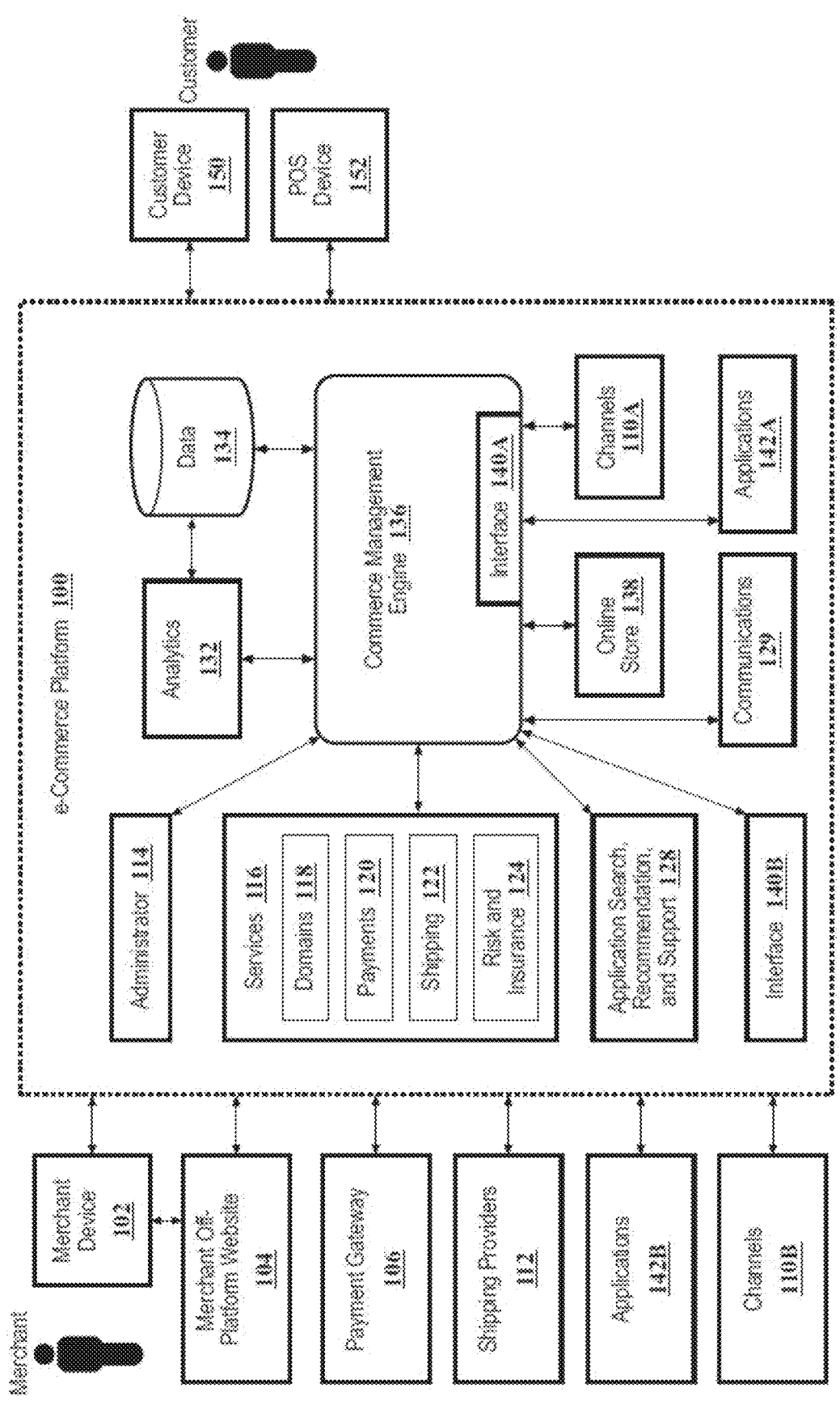
FIG. 1 is a block diagram of an e-commerce platform, according to one embodiment.

In one aspect, the present application describes a computer-implemented method. The method may include receiving, at an e-commerce platform, a product order including a purchaser identifier, at least one product identifier, and a merchant identifier; retrieving, from data storage, a purchaser profile corresponding to the purchaser identifier, the purchaser profile including return history data associated with the purchaser identifier; modifying at least one return policy rule in a return policy object based on the return history data associated with the purchaser identifier to produce a modified return policy object; associating the modified return policy object to the product order and storing the product order and the associated modified return policy object in memory; and processing the product order.

In some implementations, modifying the at least one return policy rule may be further based upon the at least one product identifier. In some cases, the at least one product identifier may include two or more product identifiers and the modifying is based in part on the two or more product identifiers.

In some implementations, the method may include determining an order return probability based, at least in part, on the at least one product identifier and the return history data associated with the purchaser identifier. In some cases, modifying the at least one return policy rule may be based, at least in part, on the order return probability.

In some implementations, retrieving may further include retrieving product return history data regarding the at least one product identifier and modifying the at least one return policy rule is further based, at least in part, on the product return history data.

In some implementations, modifying the at least one return policy rule may include modifying at least one of whether a product is returnable, a deadline for initiating a return, whether a return may be made for a full refund, a partial refund, store credit, exchange only, or some other credit, whether a return includes free shipping or incurs shipping costs, or whether there is a restocking fee.

In some implementations, storing the product order in memory may include storing the product order in a data structure that includes the modified return policy object.

In some implementations, the method may include retrieving a merchant return policy based on the merchant identifier and pre-populating fields of the return policy object based on the merchant return policy prior to the modifying.

In some implementations, receiving may further include determining that the return policy object is to be modified based on determining an order return probability and determining that the order return probability exceeds a predetermined threshold probability.

In some implementations, processing the product order may include transmitting the product order to a third party order fulfillment account.

In another aspect, the present application discloses an e-commerce system that may include a processor; an interface coupled to the processor to receive, from a purchaser device, a product order including a purchaser identifier, at least one product identifier, and a merchant identifier; a data storage containing a purchaser profile corresponding to the purchaser identifier, the purchaser profile including return history data associated with the purchaser identifier; and a memory storing return policy generation software containing computer-executable instructions that, when executed by the processor, are to cause the processor to carry out at least some of the operations of a method described herein.

In a further aspect, the present application describes a non-transitory computer-readable medium storing processor-executable instructions that, when executed by one or more processors, are to cause the one or more processors to carry out at least some of the operations of a method described herein.

For illustrative purposes, specific example embodiments will now be explained in greater detail below in conjunction with the figures.

Example e-Commerce Platform

In some embodiments, the methods disclosed herein may be performed on or in association with an e-commerce platform. Therefore, an example of an e-commerce platform will be described.

FIG. 1 illustrates an e-commerce platform 100, according to one embodiment.

The e-commerce platform 100 may be used to provide merchant products and services to customers. While the present disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their web site through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
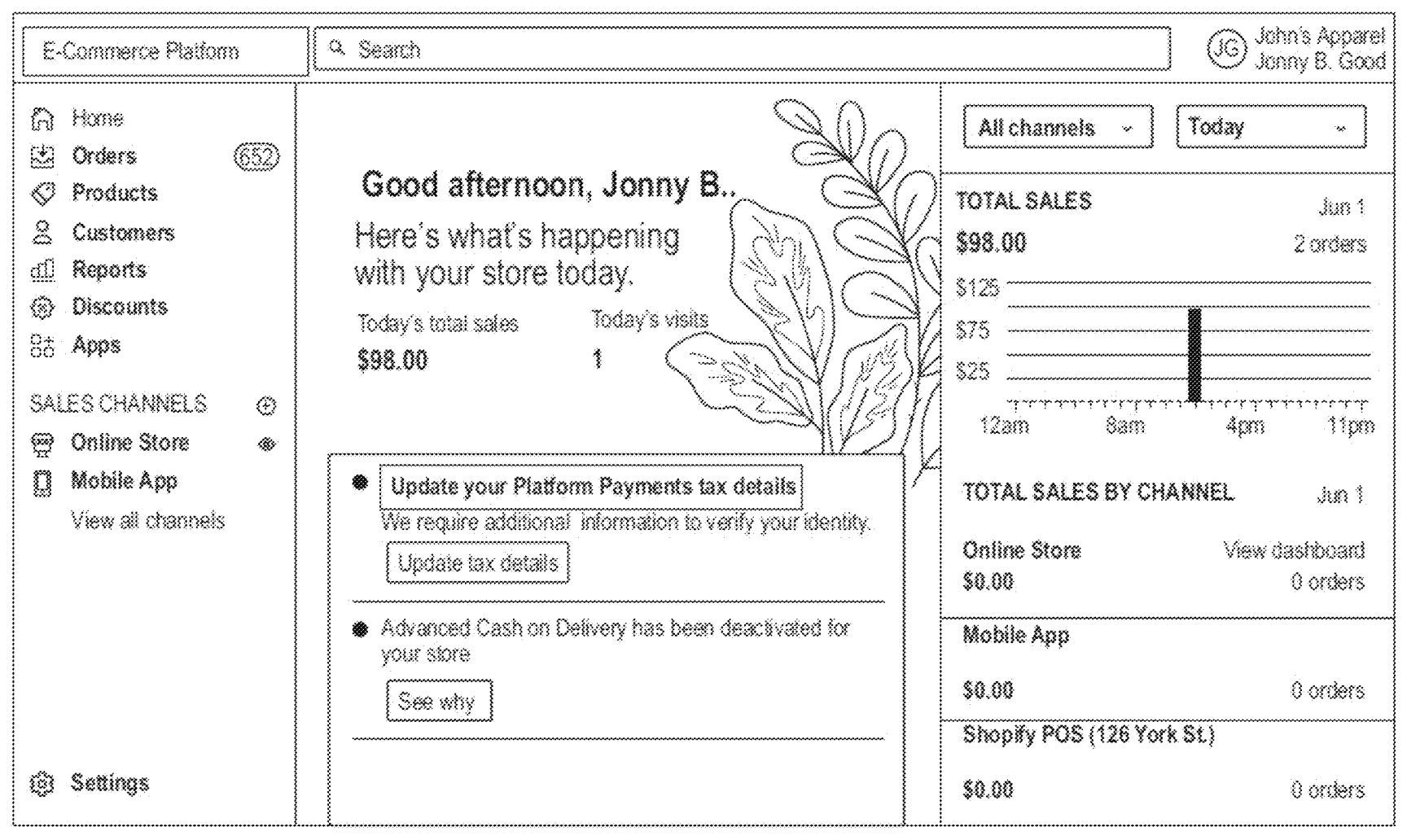

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which may facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development)

enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B).

In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. Conditions may be imposed on returns, such as requiring that they be initiated within a set period of the original order date, such as 30 days. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Product Returns of Online Purchases

In the case of online product retailing, product returns present a growing problem. In general, online merchants attempt to implement generous return policies to encourage online purchases and reduce purchaser fear of being take advantage of. Because the purchaser is unable to physically assess a product for suitability, size, colour, etc., the purchaser may be reluctant to commit to a purchase without the ability to return the product if it does not meet the purchaser's needs once they have it in their hands and unpackaged.

Returns can be costly from an environmental and waste perspective, both due to repeat shipping and product spoilage. The shipping of product to a purchaser and its return to the merchant has an obvious environmental cost. The use and destruction of packaging has an environmental cost. Moreover, many retailers in many product categories have a policy that at least certain returned merchandise may not be restocked and resold. This may lead to landfilling of a significant percentage of returned merchandise.

The issue of returns is a particular issue for online retailing since the purchaser is unable to assess the product in real life until the order has been processed, payment made, and the product has been shipped to the purchaser and unpackaged. The generous return policies offered by many merchants to alleviate purchaser risk of unsatisfactory purchases has resulted in a high incidence of orders with built-in return behaviour. As an example, a purchaser of an item of clothing may order two or three sizes of the item knowing that only one of them will be kept and the others returned once proper sizing is assessed. As another example, a purchaser may order an item knowing that they only intend to use the item for a short period of time and will then return the item. For example, a purchaser may order a large screen television in advance of a special television event, such as broadcast of the Superbowl, with the intention of using the television and then returning it after the event is over.

One solution is to eliminate returns or impose fees or other restrictions on returns. While this may reduce the incidence of returns, it may have negative consequence on purchaser satisfaction and overall sales activity through online channels. Accordingly, it would be advantageous to provide for a modification to the online platform that reduces the incidence of unnecessary returns, but that does not rely on trying to influence purchaser behaviour using economic tools.

Staged Fulfillment

A possible solution is for the online e-commerce platform to determine, prior to completion of an order, a likelihood of a return occurring with a certain order and to modify the online product fulfillment process in such a manner as to reduce the likelihood of returns. This solution presents a technical challenge in that the platform is to determine a measurement of return likelihood for a particular order. It presents a further technical challenge in that the platform is to determine what modification to the fulfilment process will reduce the likelihood of a return and to then implement that modification through suitable changes to the communication flow between the platform and external devices and in terms of the objects created and/or stored on the platform and their interrelationships.

In accordance with some of the examples provided below, the platform may determine return likelihood in part based on stored records regarding purchaser history linked to the purchaser identifier associated with a current order. Another or an alternative factor may include product category and stored data regarding return probabilities across product categories. In some cases, the return probability may be associated with sub-categories, individual product items, or combinations of product items, e.g. product variants, such as two or more sizes of the same product item. The determined return probability may trigger a modified fulfillment process if it exceeds a threshold probability level.

Modified fulfillment may involve, for example, determining and outputting an order modification that would reduce the return likelihood. Modified fulfillment may involve, for example, identifying one or more items in an order more likely to be returned than others in the order, and generating a staged fulfilment schedule. The staged fulfilment schedule may involve splitting the order to place one or more items in a first order and the more likely to be returned items in a second order. The second order may be held from fulfillment until a signal or indication is received confirming that the second order should be fulfilled. The signal/indication may be received from a shipping provider confirming delivery of the first order. In some cases, a signal confirming the delivery of the first order may trigger an inquiry process in which the purchaser is sent a message requesting a confirmation response before the second order is fulfilled. In some embodiments, the first and second order may be implemented at the shopping cart stage such that payment for the second order does not occur until after confirmation from the purchaser is received. In some embodiments, the first and second order may be implemented at the order review and fulfillment stage following payment processing, such that if the second order is cancelled then a refund process is initiated.

In some cases, whether implemented at the shopping cart stage or at the order review and fulfillment stage, the platform may cause display of the staged fulfillment schedule to the purchaser as an option. Purchaser acceptance may be a prerequisite to implementing the staged fulfillment schedule in some cases. In some cases, a discount or other credit may be provided for acceptance of the staged fulfillment schedule.

Figure 3:
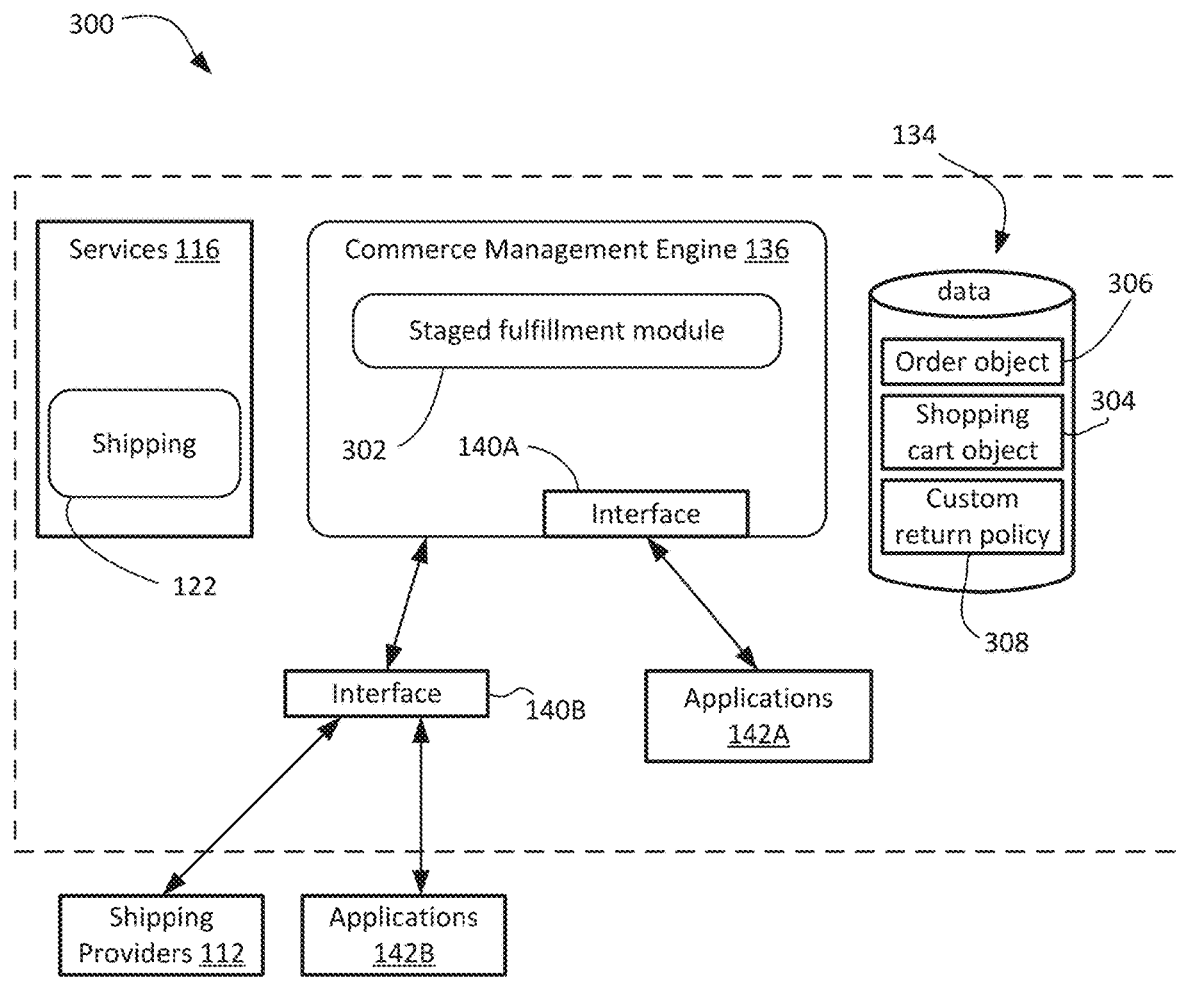
FIG. 3 partially illustrates an example e-commerce platform in block diagram form.

Reference is now made to FIG. 3, which partially illustrates an example e-commerce platform 300 in block diagram form. Not all components of the e-commerce platform 300 are illustrated. The e-commerce platform 300 includes the commerce management engine 136 and its interfaces 140A-B, applications 142A-B, services 116 and the data facility 134. The commerce management engine 136 includes a staged fulfillment module 302. The staged fulfillment module 302 may be a software-implement module containing processor-executable instructions that, when executed by one or more processors in the platform 300, cause the platform 300 to carry out some of the processes and functions described herein. Although illustrated as a standalone module within the commerce management engine 136, it will be appreciated that the staged fulfillment module 302, or parts of it, may be implemented within the applications 142A-B, the shipping services 112, via the shipping provider 122, or within other components of the commerce management engine 136.

For example, as described above, the commerce management engine 136 may include certain applications or APIs implementing basic merchant functions, such as a checkout API or an order review and fulfillment API. The checkout API may implement some of the functions involved in presenting a "shopping cart" view of a current order that has not yet been confirmed or paid for. The platform 300 may enable display of a current status of an order in a shopping cart view in a suitable GUI, through which the purchaser is able to edit, cancel, modify, confirm, or otherwise manage the building of the current order. The order review and fulfillment API may be a merchant-facing API, which implements some of the functions associated with receiving payment confirmation, generating a formal order from the completed purchase, generating stock requests, notifying shipping providers 112, or other such functions or operations. The staged fulfillment module 302 may be implemented, in whole or in part, via the commerce management engine 136 applications or APIs, such as the checkout API or the order review and fulfillment API.

The data facility 134 may include one or more data storage units. In some cases, the data storage may be in database format and may include one or more databases. The databases may be relational databases in some examples. The data facility 134 is illustrated as a single unit for ease of illustration, but may include a plurality of storage units and, in some cases, storage media connected via network and external to the platform 300. The data facility 134 may store data regarding a current order, such as a shopping cart object 304. Once payment has been processed in some embodiments, the platform 300 generates and stores an order object 306. Both the shopping cart object 304 and the order object 306 may be data structures and may contain details regarding a current order. Example details include a purchaser identifier, which may link to a purchaser record also stored in the data facility 134. Both the shopping cart object 304 and the order object 306 may include product details including a product identifier or code, a quantity, any applicable parameters specified for the product and not already implied by the product identifier or code, and price data.

The data facility 134 may further include custom return policy parameters 308 in some implementation. Custom return policy parameters 308 are discussed further below.

Figure 4:
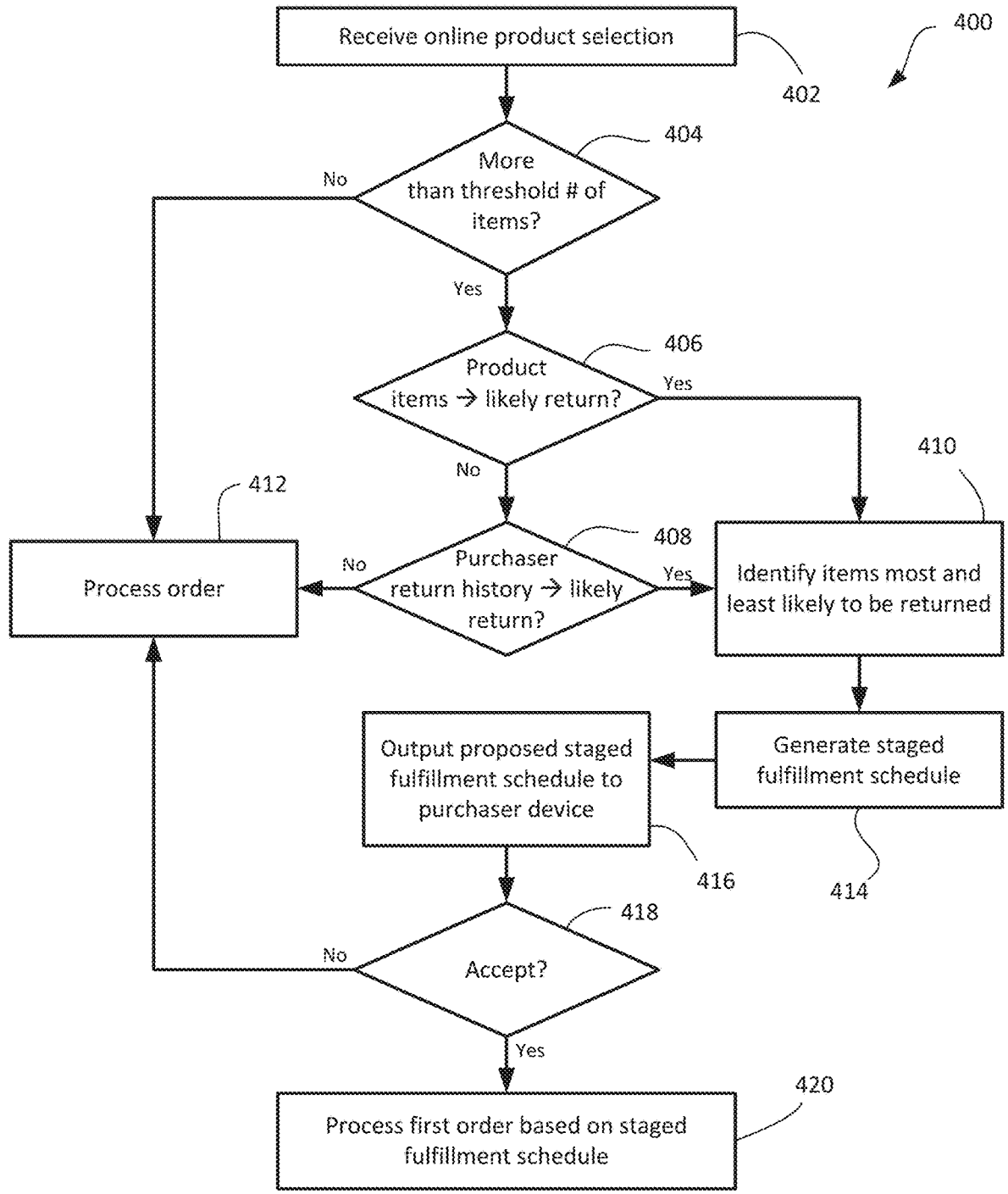
FIG. 4 shows, in flowchart form, one example method for generating a staged fulfillment schedule.

Reference is now made to FIG. 4, which shows, in flowchart form, one example method 400 for generating a staged fulfillment schedule. The method 400 may be implemented by an e-commerce platform, such as e-commerce platform 300 (FIG. 3). In some cases, the method 400 may be at least partly implemented by the staged fulfillment module 302 (FIG. 3).

The method includes receiving, at the e-commerce platform from a purchaser computing device, a product selection in operation 402. The product selection may be received in association with a purchaser identifier. In some cases, the purchaser identifier may have been determined early in the online purchasing session through a login authentication process, or through receipt of a cookie or other identifier stored on a purchaser's computing device. In some cases, the product selections may initially be made during a "guest" session in which the purchaser has not provided purchaser identifying details, until a checkout process is initiated.

The product selection includes at least one product identifier. The product identifier may be a SKU or other code. The product selection may be stored in memory in a shopping cart object at the platform. The product selection may be edited, added to, or cancelled before checkout.

Once the checkout process is initiated by a purchaser, the e-commerce platform may obtain additional information from the purchaser computing device, including purchaser identifying details, shipping address, payment information, etc. In some cases, the platform has a purchaser record relating to the purchaser identifier. The purchaser record may be retrieved from memory to prepopulate some fields during the checkout process.

During the checkout process, the platform may determine whether the order is likely to involve a returned item. If so, then a modified checkout process may be utilized. Various preconditions may be established for triggering the modified checkout process in different implementations. In this example, the platform may determine in operation 404 whether the order contains more than a threshold number of items. If not, then the platform may process the order as per normal, as indicated by operation 412. If the current order does include more than the threshold number of items, then the method 400 proceeds to operation 406. The threshold may be one, two, three, or any other number suitable for a particular implementation. In this example, the threshold may be one, such that any order containing two or more items involves assessing whether a return is likely. In some implementations, there may be no precondition on the number of items in the order such that the method 400 proceeds from operation 402 directly to operation 406.

In this example, the platform determines whether the order is likely to involve a returned item in operations 406 and 408. In some other examples, different factors may be taken into account. In this example, the platform determines whether the product items in the order make it likely that a return will occur in operation 406, and, if not, then the platform determines whether the purchaser return history nevertheless makes it likely that a return will occur in operation 408. In this regard, "likely" may be a measure of probability in some implementation, where operations 406 and 408 involve calculating a return probability based on the specified factors of product items and purchaser return history, and comparing those probabilities to a determined or predetermined level of probability that is designated as "likely". For example, the predetermined level of probability of a return that triggers the alternative fulfillment process may be set to 20%, 30%, 40%, 50%, or some other probability suitable to a given implementation. The predetermined level of probability may be dynamically adjusted over time based on average return rates or weighted average return rates in product categories, for example.

Operation 406 involves assessing return probability based on the items in the order. This may include determining a return probability per item based on the product category. For example, each item may have an associated return probability that is determined based on the return history for that category of item. In some cases, the product categories and their associated return probabilities may be broad, such as "housewares", "children's clothing", or "toys". In some cases, the product categories and their associated return probabilities may be narrower, such as "coffee mugs", "junior girls' leggings", or "board games". In yet other cases, the product categories and their associated return probabilities may be specific to a unique product item or SKU. The product item having the highest associated return probability may be taken as the probability of a return for the order in some implementations. In other implementations, the return probability for the order may be determined as a weighted function of the return probabilities of the individual items, with each item and its respective return probability additively contributing to a calculated overall return probability.

In some implementations, operation 406 may further include determining a return probability based on the combination of product items, wherein the presence of two or more particular items in an order impacts the probability determination. For example, two or more of the same item may, in some cases, reduce the probability of return depending on the nature of the item. For example, purchase of a single item may be more indicative of a lack of confidence in the suitability of the item than purchase of a larger number of the items. On the other hand, some combinations of product items may be indicative of a higher return probability. For instance, two product variants, e.g. two of the same item in different sizes, may be indicative of a higher return probability as the purchaser may intend to try both sizes and return the one that does not fit as well. Accordingly, the platform may, based on product category and the specifics of the combination of product items, adjust the order return probability higher or lower.

Operation 408 involves assessing order return probability based on purchaser history. In this regard, the platform may retrieve purchaser return history from memory based on a purchaser identifier. The retrieved return history may be across all merchants on the platform, specific to a class or category of merchants, or specific to the merchant that is the subject of the current order. The purchaser return history may also be based on the purchaser's return history for one or more of the product categories in the current order. That is, if the purchaser has a return history relating to products in the same category as the current order, then the platform may take that into account in calculating an order return probability. To illustrate by example, if a purchaser return history may indicate that the purchaser frequently returns items of a particular category. If the current order relates to items in that category, it may be indicative of a high probability of return. On the other hand, if the order relates to items in a different category for which the purchaser has bought products but never had an associated return, it may be indicative of a low probability of a return.

Although operations 406 and 408 are illustrated as separate probability determinations and evaluation in this example, it will be appreciated that the platform may determine a single probability of return taking into account both the product items in the order and the purchaser return history in combination. Indeed in some implementations, the platform may take into account other factors, including return history associated with the merchant, return history for a geographic location, time of year (since returns may be more common in connection with certain holiday periods, which may further be correlated to certain product categories), and prevailing merchant policy regarding returns (since ease or cost of return may impact probability of a return occurring).

If in operations 406 and 408 the platform determines that the order return probability exceeds the determined or predetermined level of probability indicative of a "likely" return, then in operation 410 the platform identifies the likelihood of return for each item in the order and operation 414 groups the items into a first stage and a second stage of a staged fulfillment schedule. The probability of return of each item may have been determined in operation 406 in some cases. The first stage includes product items with the least likelihood of a return, and the second stage includes products items with the highest likelihood of a return. In some cases, operation 410 may involve identifying whether one of the items is a high likelihood of return as compared to all other items in the order and tagging that item accordingly. In some cases, operation 410 may involve identifying a pair of items that are likely to involve a return because they are variants of the same item, such as in the case of different sizes of the same clothing item. In such a case, operation 410 may include identifying which of the pair of items is more likely to be returned. The return probabilities determined for the two sizes may be similar since they are the same product item for the same purchaser, but may be updated or adjusted in operation 410 based on a purchaser's buying history. For example, based on sizing of other items purchased by the same purchaser, one of the sizes may be identified by the platform as the more likely to be accepted and thus may be assigned a lower return probability.

The first stage and the second stage may be structured as a first order and a second order, or as a first shopping cart and a second shopping cart, depending on at which stage of the checkout process the alternative fulfillment is implemented and operation 414 is performed. The platform may proceed from operation 414 to operation 412 to process the first order or complete checkout with regard to the first shopping cart containing the items that are least likely to be returned. The second order or second shopping cart may be stored in memory to be accessed later for fulfillment after delivery is completed with regard to the first order. Further example details regarding the fulfillment or cancelation of the second order are discussed below.

A merchant account may have configurable settings enabling or disabling staged fulfillment as an option. For example, a merchant GUI relating to a merchant account may provide the option of enabling or disabling staged fulfillment for all orders, for particular product categories, for individual product items, etc. Operation 414 may involve applying any constraints or conditions specified in association with a merchant account.

In this example, the platform obtains purchaser approval prior to proceeding with staged fulfillment. After the staged fulfillment schedule is generated in operation 414, the platform transmits the proposed staged shipping schedule to the purchaser's computing device in operation 416. The transmission may include providing the proposed staged schedule for display in a checkout GUI prior to final confirmation of the order. The checkout GUI may include actionable selectable user interface elements for indicating acceptance of the staged shipping schedule or declining the staged shipping schedule. As indicated by operation 418, if the staged shipping schedule is declined, and the platform receives a signal indicating selection of decline, then the method 400 discards the staged shipping schedule and proceeds with a regular order processing in operation 412 without staged shipping. On the other hand, if in operation 418 the platform receives a signal indicating acceptance, then in operation 420 the platform processes the first order for fulfillment and stores the second order for later retrieval. The second order may have an associate time-based trigger in some cases, or may rely on receipt of a shipping completion notification from a shipping partner to trigger retrieval, as will be discussed further below.

Figure 5:
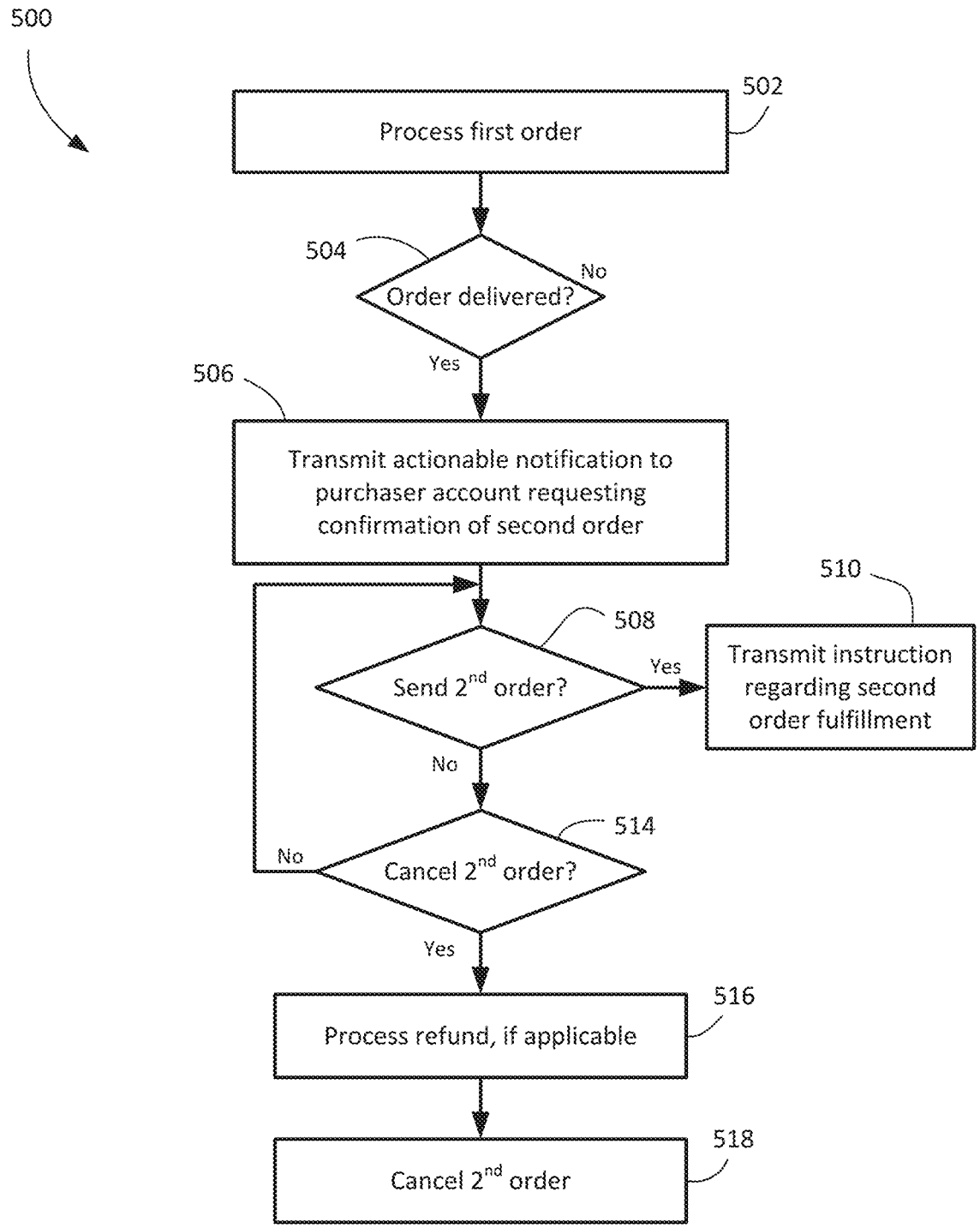
FIG. 5 shows, in flowchart form, an example method of staging fulfilment.

Referring now to FIG. 5, an example method 500 of staging fulfilment is shown in flowchart form. The method 500 may be implemented by an e-commerce platform, such as one of those described herein. As described above, the e-commerce platform may be configured to determine a return probability associated with an order and, if the return probability exceeds a determined threshold probability, implement a staged fulfillment schedule. The staged fulfillment schedule may include generating a first order containing some of the product items and a second order containing at least one product item identified as being associated with a high return probability. The second order is held in abeyance while the first order is processed. Processing of the first order may include transmitting instruction signals to computing devices associated with warehouses, shipping partners, and/or the purchaser in connection with the packaging and shipment of the first order for delivery to the designated address. Operation 502 generally reflects processing of the first order. In some instances, this may include the platform transmitting the first order to a shipping partner device or the like.

In operation 504, the platform determines whether the first order is received by the purchaser. This may include awaiting receipt of a deliver signal or delivery message from the shipping partner confirming delivery of the first order. In some cases, this may further include the platform transmitting a message, such as an email, text message, instant message, social media message, or the like, to the purchaser indicating that the first order has been delivered and requesting confirmation that the purchaser has the product items of the first order in their possession.

Once the platform determines that the product items of the first order have been delivered to the purchaser, then in operation 506 the platform may transmit to the purchaser, by email, instant message, text message, social media message, or the like, a notification regarding the continued availability of the second order. The notification may be actionable, such as through a selectable link or other actionable user interface element, to either directly indicate a user selection or to navigate to a website, webpage, application interface, or other user interface through which the user is prompted to indicate a user selection. The selection offered through the notification and/or interface is whether to confirm the second order or cancel the second order. Having now received the product items of the first order, the purchaser may be in better position to determine whether the product items of the second order are still needed.

Operations 508 and 514 indicate the platform awaiting a purchaser decision regarding confirmation or cancellation of the second order. In some cases, the notification of operation 506 may be sent a predetermined duration after determining that the first order has been received, to allow the purchaser time to evaluate suitability of the items in the first order before being asked to confirm the second order.

If the platform receives a signal from the purchaser indicating confirmation of the second order, then in operation 510 the platform processes the second order. This may include the normal fulfilment processing associated with orders on the platform, such as transmitting messaging to a warehouse and/or shipping partner. In an implementation in which the second order is stored in shopping cart format, rather than as a completed order, then operation 510 may include initiating a payment processing operation, which may include launching a payment portal on the purchaser computing device to provide payment information and complete the second order.

In operation 514, the purchaser may signal to the platform that the second order is to be cancelled. In some implementations, the second order may be automatically cancelled if a certain period of time passes after the notification of operation 502 without receipt of a confirmation or cancellation signal from the purchaser.

In operation 516, if the second order is to be cancelled, then a refund may be processed, if applicable. A refund is not required if the second order was stored in shopping cart format without having processed payment; but in some implementations the first and second order may be paid for in full at the time of the initial checkout and staged fulfillment scheduling. In operation 518, the second order is cancelled.

Figure 6:
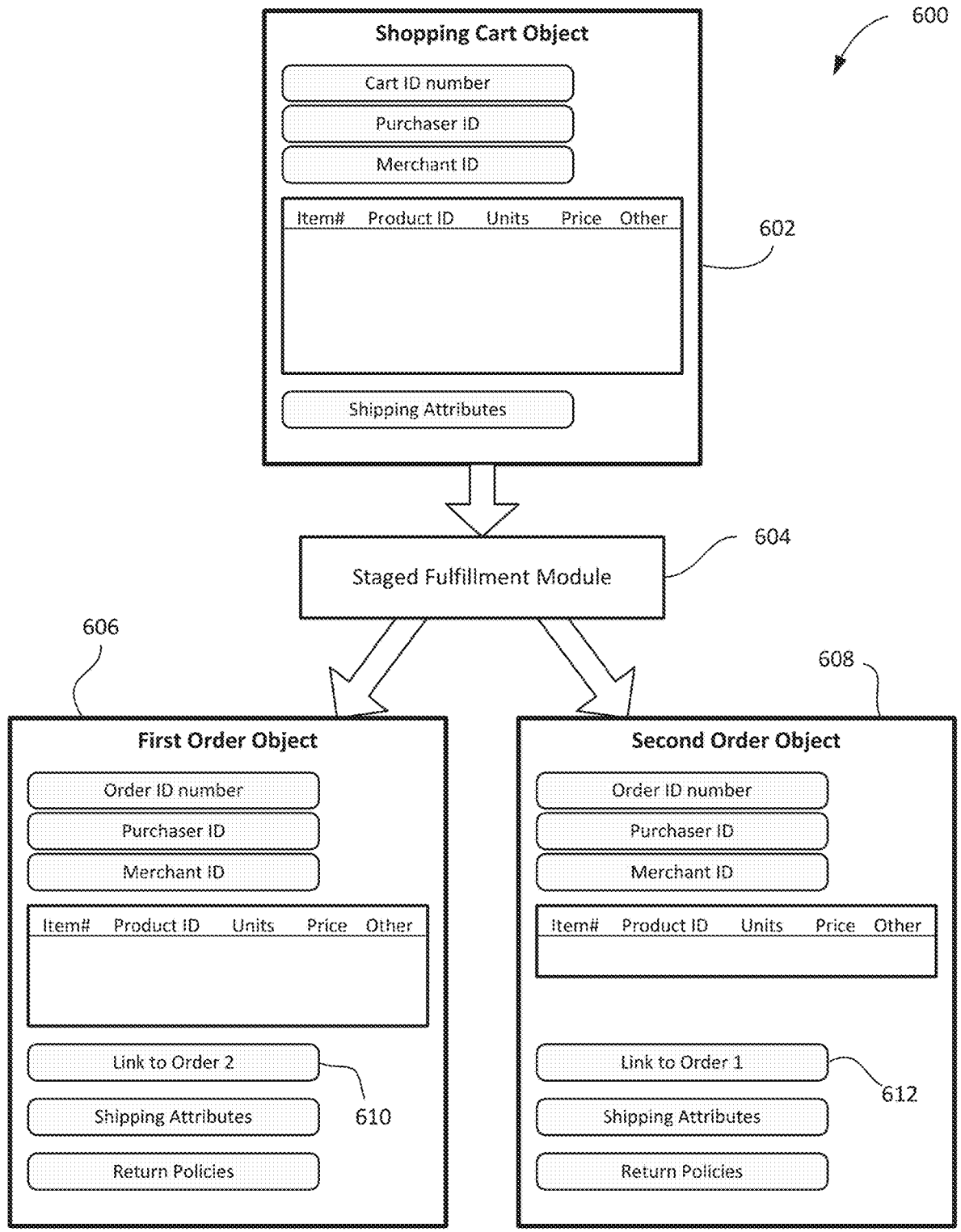
FIG. 6 diagrammatically illustrates example data structures relating to staged fulfillment.

Reference is now made to FIG. 6, which diagrammatically illustrates example data structures relating to staged fulfillment. In this example, the platform initially stores a shopping cart object 602 in accordance with a pre-defined shopping cart object model. The shopping cart object 602 may be populated with details as the purchaser selects product items to be added to his or her cart.

The shopping cart object 602 may include fields or entries relating to, for example, ID number for the object, purchaser identifier, merchant identifier, and shipping attributes like address information. The shopping cart object 602 may further include product item details for items added to the cart by the purchaser during their store browsing session. The product item details may include a product ID, which may be a SKU, a product descriptor, a number of units (e.g.

quantity ordered), pricing information, and/or other parameters or data relating to the order.

Once the checkout process is initiated on the platform, if the order return probability is determined to be greater than the determined threshold probability indicative of a likely return, then a staged fulfillment process, for example implemented by a staged fulfillment module 604, may be launched to convert the shopping cart object to a first order object 606 and a second order object 608. The staged fulfillment process identifies at least one high return probability item for inclusion in the second order object 608 and puts the remaining items from the shopping cart object 602 into the first order object 606. Each of the order objects 606, 608 is given a unique order identifier, but each also contains a respective link 610, 612, or other association, with the other. In this manner the two objects are associated or linked so that is detectable that they are part of a staged fulfillment of a composite order.

The second order object 608 is stored in memory and held from processing while the first order object 606 is processed, as described above.

Custom Return Policies

In another aspect of the present disclosure, as an alternative to or in addition to staged fulfillment, an e-commerce platform may be configured to dynamically generate a custom return policy for a specific order at the time of order creation. In the examples described below, the custom return policy is generated at least in part based on a return history retrieved from memory. The return history may include the purchaser's return history, meaning the custom return policy is adapted to the identity of the purchaser and data regarding past purchases and returns associated with the purchaser identifier. The return history may include the return history associated with the product(s), meaning the custom return policy is adapted to the specific combination of products in the purchaser shopping cart at the time of checkout. That is the combination of product items may be used, in part, to determine the return policy applicable to the order or to any one of the product items in the order. It will be appreciated that certain products may have associated fixed return policies, such as underwear or other intimates that are typically not returnable. Moreover, there may be a merchant policy that is taken into account in determining the custom return policy. For example, a merchant may have a pre-set policy of not accepting returns beyond a fixed time period, or only offering store credit for returns of a certain product category. In addition, there may be time-limited or other factors, in many cases set by the merchant through an administrative account, that may be used in determining the custom return policy, such as a certain policy restricting the return of sale items.

When a return is initiated, the platform retrieves the custom return policy to determine how to process the return. A return may be initiated through a purchaser device logging into a purchaser account and transmitting a return request message in association with a past order. This return request may be initiated through navigation to a past purchases area of the purchaser interface and selection of a return item request button or the like. This may generate a return request to the platform that associates one or more product items and the order identifier with the return request. In some cases, the return may be initiated through physical receipt of a product item; in which case, a merchant representative or platform administrative staff access the platform to initiate the return process by associating the return request with the order identifier.

The custom return policy may be stored in the order object in memory. Accordingly, by identifying the order through the order identifier, the order object may be found in memory and retrieved. From the order object, the custom return policy may be accessed and applied to the return request. In some cases, the custom return policy may be stored separately in memory on the platform, but linked to the order, such as through inclusion in the order object of a link or other identifier for the custom return policy. Accordingly, provided the order identifier is known, the order object may be retrieved and the custom return policy may be accessed either in the order object itself or through a link or other identifier found in the order object.

Figure 7:
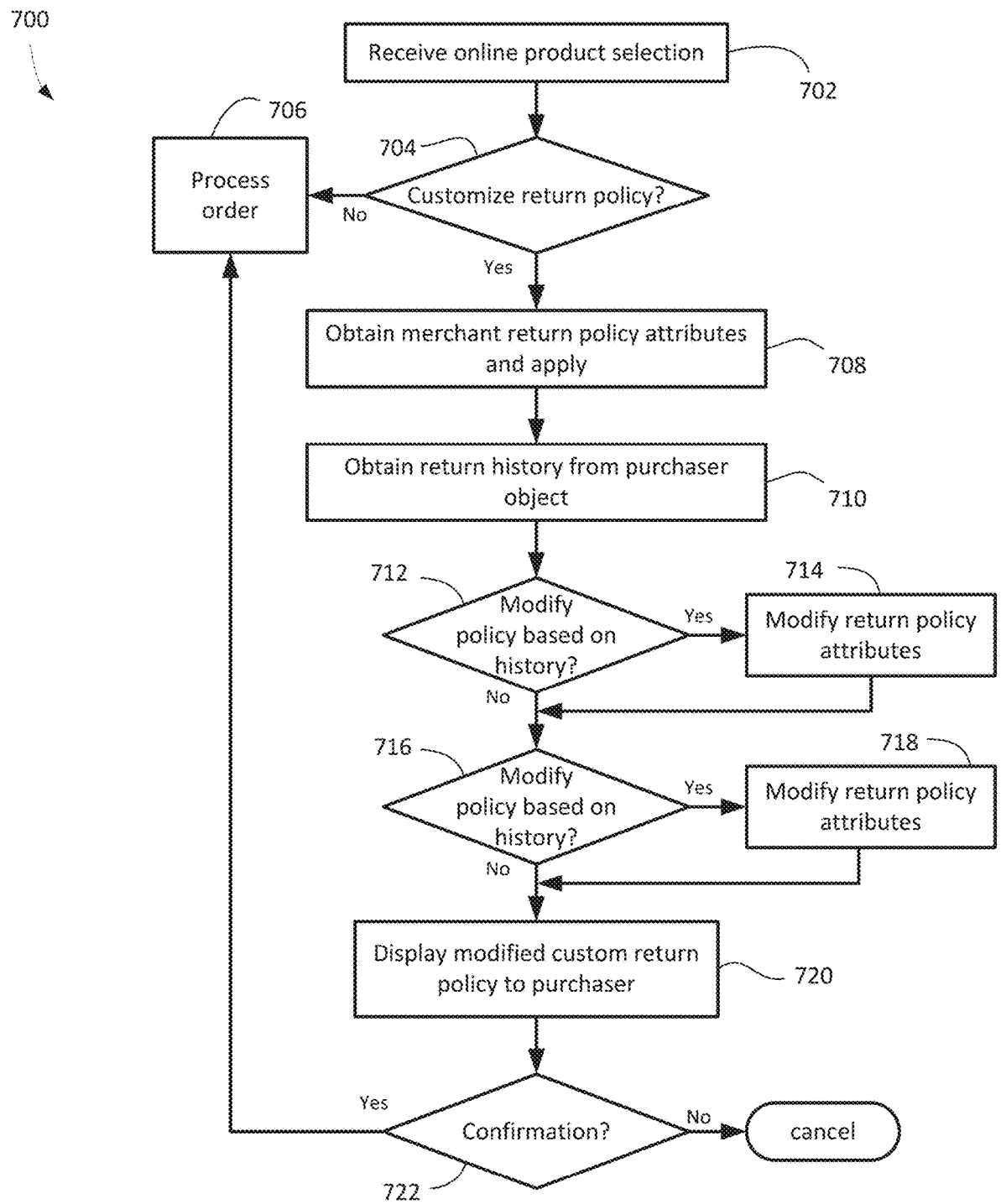
FIG. 7 shows a flowchart illustrating an example method of generating a custom return policy in connection with an e-commerce platform.

Reference will now be made to FIG. 7, which shows, in flowchart form, one example method 700 of generating a custom return policy in association with an online purchase event. The method 700 may be implemented by an e-commerce platform, such as one of the e-commerce platforms described herein. The operations of the method 700 may be implemented, at least in part, by way of computer-executable software instructions that, when executed by one or more processors, cause the software and hardware elements of the platform to carry out the operations and functions described.

The method 700 includes, in operation 702, receipt of a product selection in the context of an online marketplace. The product selection may be received and/or stored in a data structure such as a shopping cart object or an order object, as examples. The object may contain information regarding the product items and their quantities. The object may contain or be associated with a purchaser identifier, a merchant identifier, and/or shipping attributes. Operation 702 may occur over the course of an online browsing and product selection process by the purchaser via a purchaser device connecting to the platform through an application, website, portal or other user interface providing product offerings for selection. Operation 702 may end when the purchaser initiates a checkout process in some implementations.

In operation 704, the platform determines whether to generate a custom return policy. This determination may be based on various possible triggers to use a custom return policy. In one example, the platform may be configured to always use a custom return policy. In another example, the platform may be configured to use a default return policy unless a trigger event is detected in operation 704. If the platform determines that no custom return policy is to be generated and applied, then the method 700 proceeds to operation 706 to process the order in the usual manner. In such a case, the default return policy may be applied. This may be set by a merchant from which the product(s) are being purchased, in many cases.

In one example, operation 704 may include determining a probability of return for the order and comparing the probability with a predetermined threshold probability. The determination of the probability of return may be similar or identical to the determination described above in operations 406 and 408 of FIG. 4, for example. The predetermined threshold probability may be the same as or different from the predetermined level of probability described above in connection with FIG. 4. In some examples, a custom return policy may be generated and applied if the probability of a return exceeds the predetermined threshold probability. In some examples, the custom return policy may be generated and applied if the probability of a return is lower than the predetermined threshold probability.

In another example, operation 704 may be based on a purchaser return history. That is, the purchaser identifier may link to a purchaser record in memory that includes past purchase and return data for that purchaser account. The past purchaser and return data may relate to the same product categories as the current order, different product categories than the products in the current order, the same merchant as the current order, or different merchants than the merchant involved in the current order. The determination to generate and apply a custom return policy may be based on the return history for the purchaser. In some examples, a purchaser that has a higher than normal or higher than a pre-set threshold percentage of returns in their purchasing history may lead to a custom return policy.

In yet another example, operation 704 may be based on the product selection in the current order. In some examples, the product items may trigger use of a custom return policy. As an example, if the product items are two or more of the same item in different sizes or different colours, then the platform may determine that a custom return policy should apply. As another example, if the product items include one particular item in a large quantity, then the platform may determine that a custom return policy should apply.

In yet a further example, operation 704 may include making a determination based on combinations or sub-combinations of the above factors. For example, the determination to use a custom return policy may be based on detection of a higher-than-threshold purchaser return history in a certain product category and inclusion of a product in the order from that product category. As another example, the determination to use a custom return policy may be based on a purchase history for the purchase that indicates a regular purchase of an item in a certain quantity, and the inclusion of that item in the current order but in a much smaller or much larger quantity than indicated by the purchase history.

Other factors may be used in determining that a custom return policy is to be generated and applied. For instance, the trigger may be based on the merchant's return history exceeding a certain level, the return history for the product category across all merchants, the location of the purchaser, the correlation between the purchaser and a cohort of similar purchasers having a high return rate, external factors such as proximity in time to a significant event or holiday, and/or inferred intent from external sources, including social media accounts associated with the purchaser.

If a custom return policy is to be generated, then in operation 708 the default return policy rules set by the merchant or merchants involved in the current order are retrieved from memory. In some cases, the merchant-specific return policy rules may be specified in the merchant object, which may be retrieved from memory based on a merchant identifier in the current order. The merchant-specific return policy rules may set minimum return policy rules. As examples, the rules may specify only store credit is available for certain product items or product categories, or that returns must be initiated within six weeks or some other time period after the purchase occurs.

The default return policy rules may be used in generating an initial return policy object or other data structure reflecting the custom return policy. In some cases, the data structure for the custom return policy may be contained within the order object.

In operation 710, if not already retrieved, then the platform retrieves return history from memory. The return history may include the purchaser return history, the product items' return history, or both. The purchaser return history details may be stored in a purchaser object linked to the purchaser identifier, or in some other data structure obtainable using the purchaser identifier. The purchaser return history may include data regarding past purchases, returns, disputes, payments, and other purchase activities. The data may be sortable by merchant, product category, geographic location, etc. The product return history may be specific to the merchant, or may be product return history across merchants. In some cases, the product return history may be by product category rather than for specific product items.

In operation 712, the platform determines whether to modify the custom return policy based on the return history. As an example, if a purchaser that has a higher than normal or higher than a threshold percentage of returns in their purchasing history the platform may determine that the return policy should be adjusted to further restrict the return policy rules, such as by shortening the return time window, restricting or eliminating the availability of refunds or credit, imposing restocking fees, or other such rules. As another example, the product category return history may indicate a low likelihood of returns, which may result permitting a more relaxed return policy with regard to items in that category. A combination of purchaser return history and product return history may factor into determining whether and how to modify the custom return policy in some cases. For example, a product return history that indicates a high likelihood of returns may be counterbalanced by a purchaser return history that indicates the purchase rarely or never returns items, which may be used in determining whether and how to modify the return policy rules.

If the platform determines from the return history that the custom return policy is to be modified, then in operation 714 it applies those modifications. Operation 714 may include modifying a rule in the custom return policy, adding a new rule to the custom return policy, removing a rule from the custom return policy, or a combination thereof. The changes are saved in the data structure containing the custom return policy.

In operation 716, the platform determines whether to modify the custom return policy based on the combination of product items in the order. As an illustrative example, if the product items are variants, e.g. two or more of the same item in different sizes or different colours, then the platform may determine that a custom rule may be created specifying that only one of those product items may be returned. As another example, if the product items include one particular item in a large quantity, then the platform may set a custom return policy rule restricting or eliminating returns for some or all of that product item, or imposing restrictions in timing or shipping costs for returns.

It will be appreciated that the product items and return history may be used in combination to determine custom return policy rules.

Although operations 712-716 are illustrated separately for ease of explanation, it will be appreciated that these operations may be performed in combination, as a single multi-factor determination and modification, in a different sequence, in parallel, or may involve additional factors.

Modifications to the custom return policy may involve setting or modifying a rule applicable to the entire order or to one or more product items in the order. The rule may specify whether a product item is returnable, the deadline for initiating a return, whether the return may be made for a full refund, a partial refund, store credit, exchange only, or some other credit, whether the return involves free shipping or shipping costs, whether there is a restocking fee, or any other parameters relating to returns.

In operation 720 the platform displays the custom return policy rules to the purchaser via a suitable user interface. In many implementations, this includes displaying the custom return policy rules during the checkout process before the purchaser has confirmed the order. In some implementations, the custom return policy rules may not be directly displayed, but may be accessible via a link or may be displayed if the user taps or hovers over an icon or other interface element relating to return policy.

In operation 722 the purchaser either confirms or cancels the order. If the order is cancelled, i.e. the checkout process is aborted, then the platform may retain the prospective purchase information in a shopping cart object to enable the purchaser to edit or add to the prospective order. If the order is confirmed, then the method 700 proceeds to operation 706 to process the order. The custom return policy rules are stored in memory in association with the order so as to be easily retrieved in the event of a return. In some cases, the custom return policy rules are stored in the order object together with the other order information. In some cases, the order object includes a link or other identifier for the custom return policy, which is stored in a separate data structure.

Figure 8:
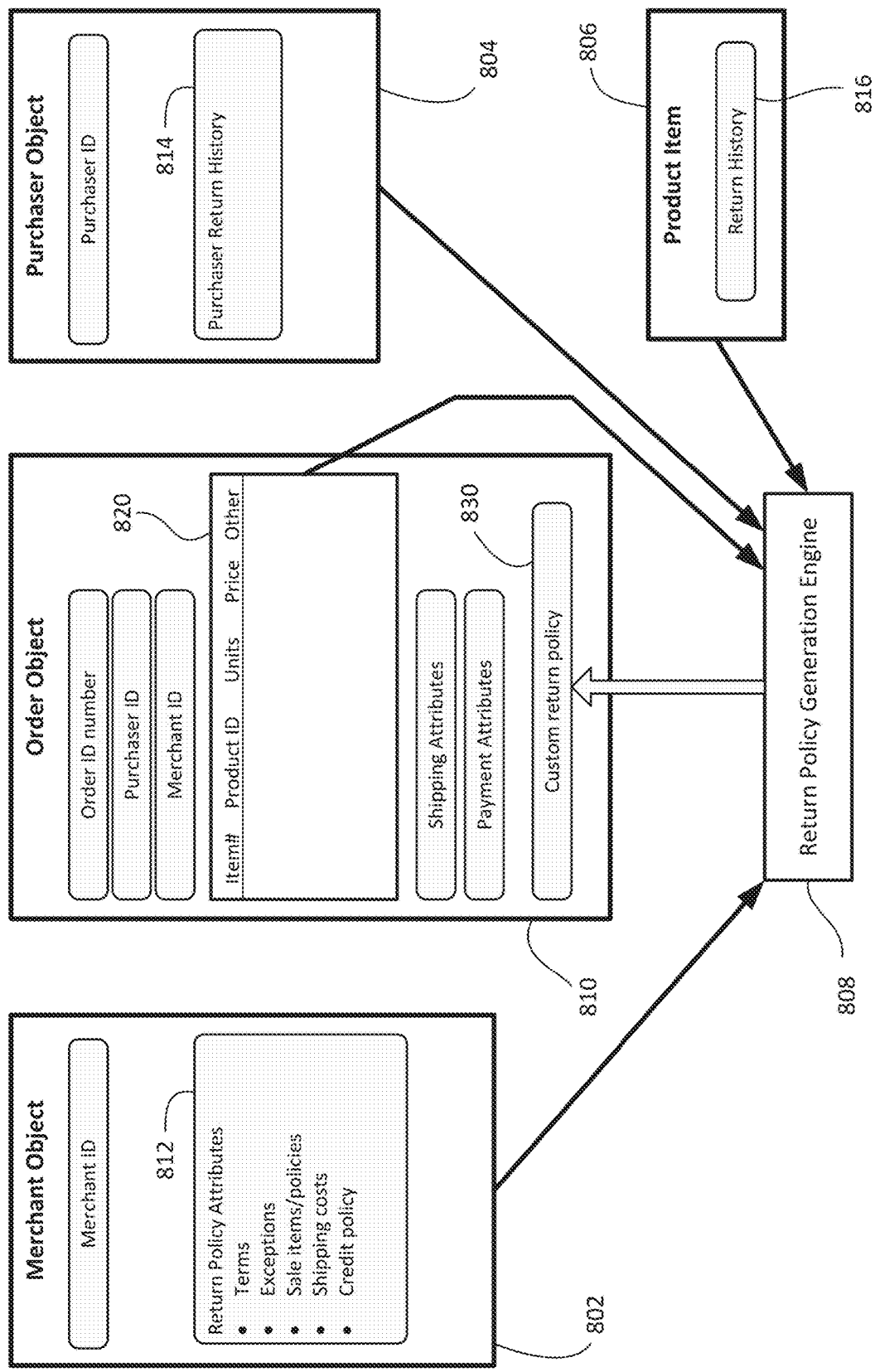
FIG. 8 diagrammatically illustrates example data structures relating to the generation of a custom return policy.

FIG. 8 diagrammatically illustrates the data structures that may be involved in generating a custom return policy. The data structures may include a merchant object 802 containing data regarding the merchant, including a merchant identifier, and a purchaser object 804 containing data regarding the purchaser, including a purchaser identifier. The structures may also include a product item object 806, which may contain data regarding a product item or product category.

An order object 810 may include data regarding the prospective order, such as an order identifier and order details 820 specifying the product items and quantities included in the order. In this example, a custom return policy 830 is also contained in the order object; although in some other embodiments, the custom return policy 830 may be created and stored outside the order object 810. The custom return policy 830 may include a field or set of fields or other data elements in the order object 810, containing parameters, attributes or other data specifying the rules of the custom return policy. The rules may include one or more associations with individual product items to the extent that a rule applies to a specific item and not the entire order.

A return policy generation engine 808 may carry out the functions of obtaining data from the various objects and populating or modifying the fields of the custom return policy 830. The return policy generation engine 808 may be implemented by way of one or more software modules or applications, or as a part of a larger software package. The software may include computer-executable instructions that, when executed by one or more processors within the platform, cause the processors to carry out the operations described herein.

The return policy generation engine 808, in some examples, may retrieve return policy attributes 812 from the merchant object 802. The return policy attributes 812 may represent minimum or default return policy rules set by the merchant. The return policy generation engine 808 may use the return policy attributes 812 as the basis for initially building or setting the custom return policy 830 in some implementations.

The return policy generation engine 808 may retrieve purchaser return history 814 from the purchaser object 804. The purchaser return history 814 in this example details return information associated with previous purchaser activity on the platform. In some cases, the purchaser return history 814 includes data regarding prior purchases and prior returns to enable the return policy generation engine 808 to assess rates of return for the purchaser and by product category.

The return policy generation engine 808 may retrieve product return history 816 from the product item object 806. The product return history 816 in this example may include return history for the specific product item or for the product category to which it belongs.

Using the purchaser return history 814, the product return history 816, and/or the order details 820, the return policy generation engine 808 determines whether to modify the custom return policy 830 and, if so, in what manner. Any changes are saved in memory as the custom return policy 830 to be retrieved in the event of a return.

Although many of the above examples refer to an "object" when discussing a data structure, it will be appreciated that this does not necessarily restrict the present application to implementation using object-oriented programming languages, and does not necessarily imply that the data structure is of a particular type or format. Data structures may have different names in different software paradigms.

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, the method comprising:
 receiving, at an e-commerce platform, an initiation of a checkout process for a product order, the product order including a purchaser identifier, at least one product identifier, and a merchant identifier;
 processing the checkout process, including:
  prior to obtaining confirmation of the checkout process:
   retrieving, from data storage, a purchaser profile corresponding to the purchaser identifier, the purchaser profile including return history data associated with the purchaser identifier,
   determining that a custom return policy is to be generated for the product order, the determining including detecting a trigger event by calculating an order return probability based on the at least one product identifier and the return history data, and determining that the order return probability exceeds a predetermined threshold probability, and
   in response to determining that the custom return policy is to be generated for the product order, modifying at least one return policy rule in a return policy object based on the return history data associated with the purchaser identifier to produce a modified return policy object;
  providing the order for confirmation, the providing including transmitting the modified return policy to a purchaser device for display thereon;
  receiving, from the purchaser device, a confirmation signal; and
  in response to the confirmation signal, completing processing of the checkout process, the completing including associating the modified return policy object to the product order and storing the product order and the associated modified return policy object in memory;
 subsequently receiving, at the e-commerce platform, a return request message regarding the product order; and
 in response to the return request, retrieving the associated modified return policy object and processing the return request based on the associated modified return policy object.

2. The computer-implemented method of claim 1, wherein modifying the at least one return policy rule is further based upon the at least one product identifier.

3. The computer-implemented method of claim 2, wherein the at least one product identifier includes two or more product identifiers and wherein the modifying is based in part on the two or more product identifiers.

4. The computer-implemented method of claim 1, wherein modifying the at least one return policy rule is based, at least in part, on the order return probability.

5. The computer-implemented method of claim 1, wherein retrieving further includes retrieving product return history data regarding the at least one product identifier and wherein modifying the at least one return policy rule is further based, at least in part, on the product return history data.

6. The computer-implemented method of claim 1, wherein modifying the at least one return policy rule includes modifying at least one of whether a product is returnable, a deadline for initiating a return, whether a return may be made for a full refund, a partial refund, store credit, exchange only, or some other credit, whether a return includes free shipping or incurs shipping costs, or whether there is a restocking fee.

7. The computer-implemented method of claim 1, wherein storing the product order in memory includes storing the product order in a data structure that includes the modified return policy object.

8. The computer-implemented method of claim 1, further comprising retrieving a merchant return policy based on the merchant identifier and pre-populating fields of the return policy object based on the merchant return policy prior to the modifying.

9. The computer-implemented method of claim 1, wherein processing the product order includes transmitting the product order to a third party order fulfillment account.

10. An e-commerce system, comprising:
a processor;
an interface coupled to the processor to receive, from a purchaser device, an initiation of a checkout process for a product order, the product order including a purchaser identifier, at least one product identifier, and a merchant identifier;
a data storage containing a purchaser profile corresponding to the purchaser identifier, the purchaser profile including return history data associated with the purchaser identifier; and
a memory storing return policy generation software containing computer-executable instructions that, when executed by the processor, are to cause the processor to:
process the checkout process, including:
prior to obtaining confirmation of the checkout process:
determine that a custom return policy is to be generated for the product order by detecting a trigger event by calculating an order return probability based on the at least one product identifier and the return history data, and determining that the order return probability exceeds a predetermined threshold probability, and
in response to determining that the custom return policy is to be generated for the product order, modify at least one return policy rule in a return policy object based on the return history data associated with the purchaser identifier to produce a modified return policy object;
provide the order for confirmation, including transmitting the modified return policy to the purchaser device for display thereon;
receive, from the purchaser device, a confirmation signal; and
in response to the confirmation signal, complete processing of the checkout process, including associating the modified return policy object to the product order and storing the product order and the associated modified return policy object in the data storage;
subsequently receive, at the e-commerce platform, a return request message regarding the product order; and
in response to the return request, retrieve the associated modified return policy object and process the return request based on the associated modified return policy object.

11. The e-commerce system of claim 10, wherein the instructions, when executed by the processor, are to cause the processor to modify the at least one return policy rule further based upon the at least one product identifier.

12. The e-commerce system of claim 11, wherein the at least one product identifier includes two or more product identifiers and wherein the modifying is based in part on the two or more product identifiers.

13. The e-commerce system of claim 10, wherein the instructions, when executed by the processor, are to cause the processor to modify the at least one return policy rule based, at least in part, on the order return probability.

14. The e-commerce system of claim 10, wherein the instructions, when executed by the processor, are to further cause the processor to retrieve product return history data regarding the at least one product identifier and to modify the at least one return policy rule based, at least in part, on the product return history data.

15. The e-commerce system of claim 10, wherein the instructions, when executed by the processor, are to cause the processor to modify the at least one return policy rule by modifying at least one of whether a product is returnable, a deadline for initiating a return, whether a return may be made for a full refund, a partial refund, store credit, exchange only, or some other credit, whether a return includes free shipping or incurs shipping costs, or whether there is a restocking fee.

16. The e-commerce system of claim 10, wherein the instructions, when executed by the processor, are to cause the processor to store the product order in memory by storing the product order in a data structure that includes the modified return policy object.

17. The e-commerce system of claim 10, wherein the instructions, when executed by the processor, are to further cause the processor to retrieve a merchant return policy based on the merchant identifier and to pre-populate fields of the return policy object based on the merchant return policy prior to the modifying.

18. The e-commerce system of claim 10, wherein the instructions, when executed by the processor, are to cause the processor to process the product order by transmitting the product order to a third party order fulfillment account.

19. A non-transitory computer-readable medium storing processor-executable instructions that, when executed by one or more processors, are to cause the one or more processors to:
receive, at an e-commerce platform, an initiation of a checkout process for a product order, the product order including a purchaser identifier, at least one product identifier, and a merchant identifier;
process the checkout process, including:
prior to obtaining confirmation of the checkout process:
retrieve, from data storage, a purchaser profile corresponding to the purchaser identifier, the purchaser profile including return history data associated with the purchaser identifier, determine that a custom return policy is to be generated for the product order by detecting a trigger event by calculating an order return probability based on the at least one product identifier and the return history data, and determining that the order return probability exceeds a predetermined threshold probability, and in response to determining that the custom return policy is to be generated for the product order, modify at least one return policy rule in a return policy object based on the return history data associated with the purchaser identifier to produce a modified return policy object;

provide the order for confirmation including transmitting the modified return policy to a purchaser device for display thereon;

receive, from the purchaser device, a confirmation signal; and in response to the confirmation signal, complete processing of the checkout process, including associating the modified return policy object to the product order and storing the product order and the associated modified return policy object in memory;

subsequently receive, at the e-commerce platform, a return request message regarding the product order; and in response to the return request, retrieve the associated modified return policy object and process the return request based on the associated modified return policy object.

20. The non-transitory computer-readable medium of claim 19, wherein the instructions, when executed by the one or more processors, are to cause the one or more processors to modify the at least one return policy rule further based upon the at least one product identifier.

21. The non-transitory computer-readable medium of claim 20, wherein the at least one product identifier includes two or more product identifiers and wherein the modifying is based in part on the two or more product identifiers.

22. The non-transitory computer-readable medium of claim 19, wherein the instructions, when executed by the one or more processors, are to further cause the one or more processors to retrieve product return history data regarding the at least one product identifier and to modify the at least one return policy rule based, at least in part, on the product return history data.

23. The non-transitory computer-readable medium of claim 19, wherein the instructions, when executed by the one or more processors, are to further cause the one or more processors to retrieve a merchant return policy based on the merchant identifier and to pre-populate fields of the return policy object based on the merchant return policy prior to the modifying.

* * * * *